(No Model.)  G. A. COLBY.  5 Sheets—Sheet 1.
SECTIONAL STEAM BOILER.

No. 301,964.  Patented July 15, 1884.

Attest
Paul A. Staly
M. L. Raftree

Inventor
Gilbert A. Colby
By George P. Barton
Attorney

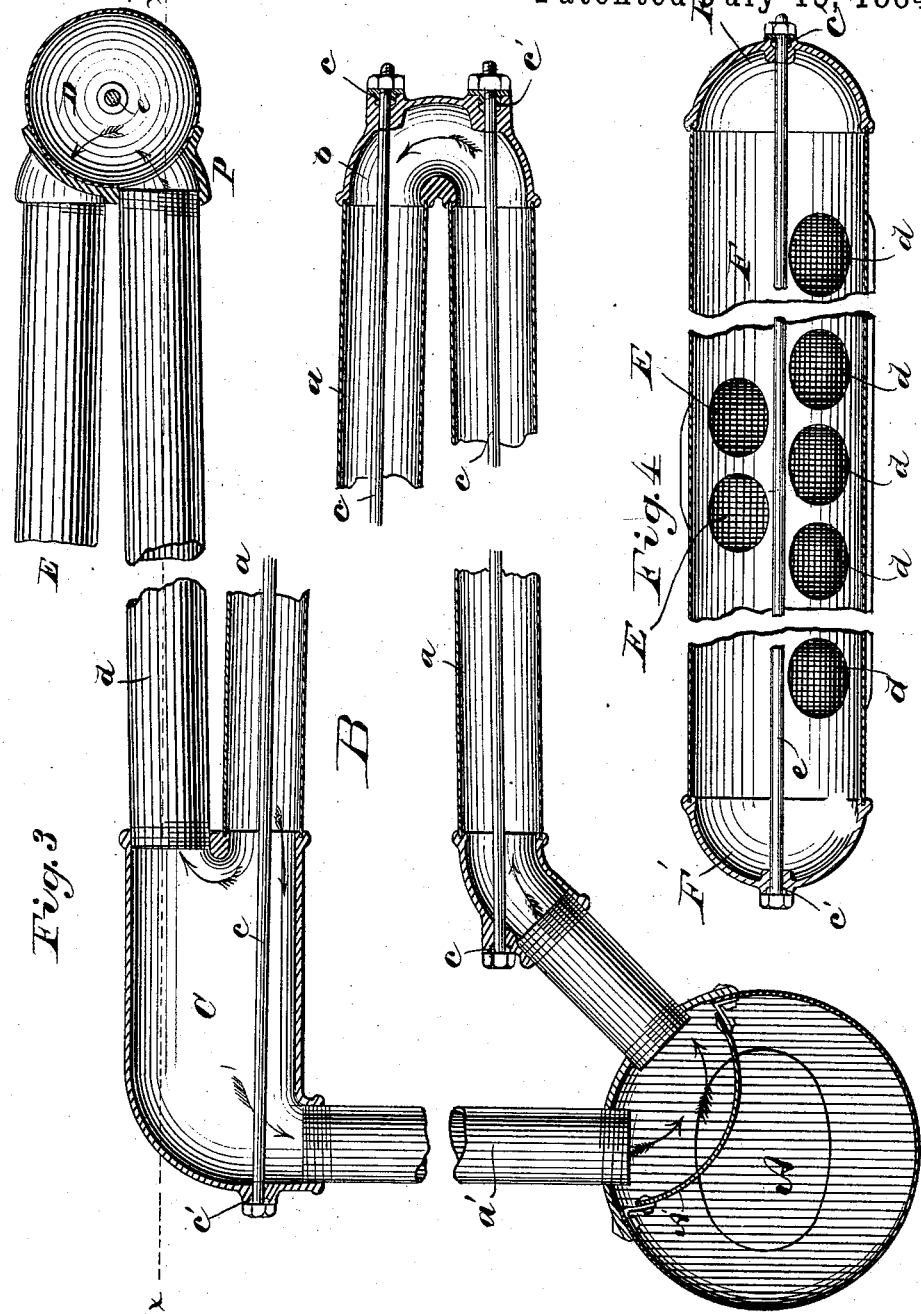

(No Model.)
5 Sheets—Sheet 3.
G. A. COLBY.
SECTIONAL STEAM BOILER.
No. 301,964.   Patented July 15, 1884.
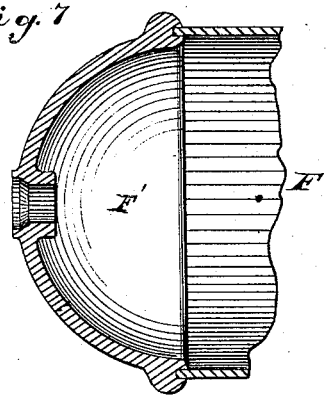
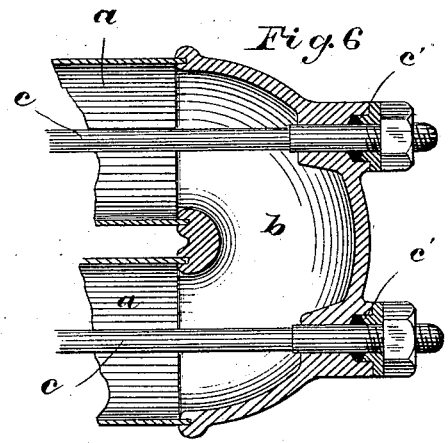
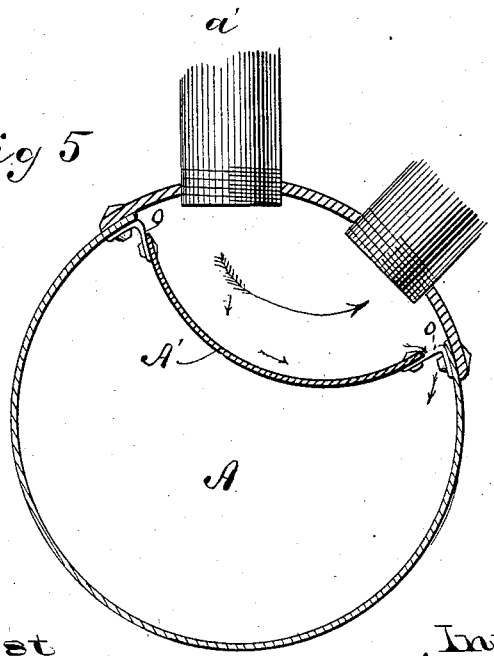
Attest
Saul A Staley
M. L. Rafvill
Inventor
Gilbert A. Colby,
By George R. Barton
Attorney

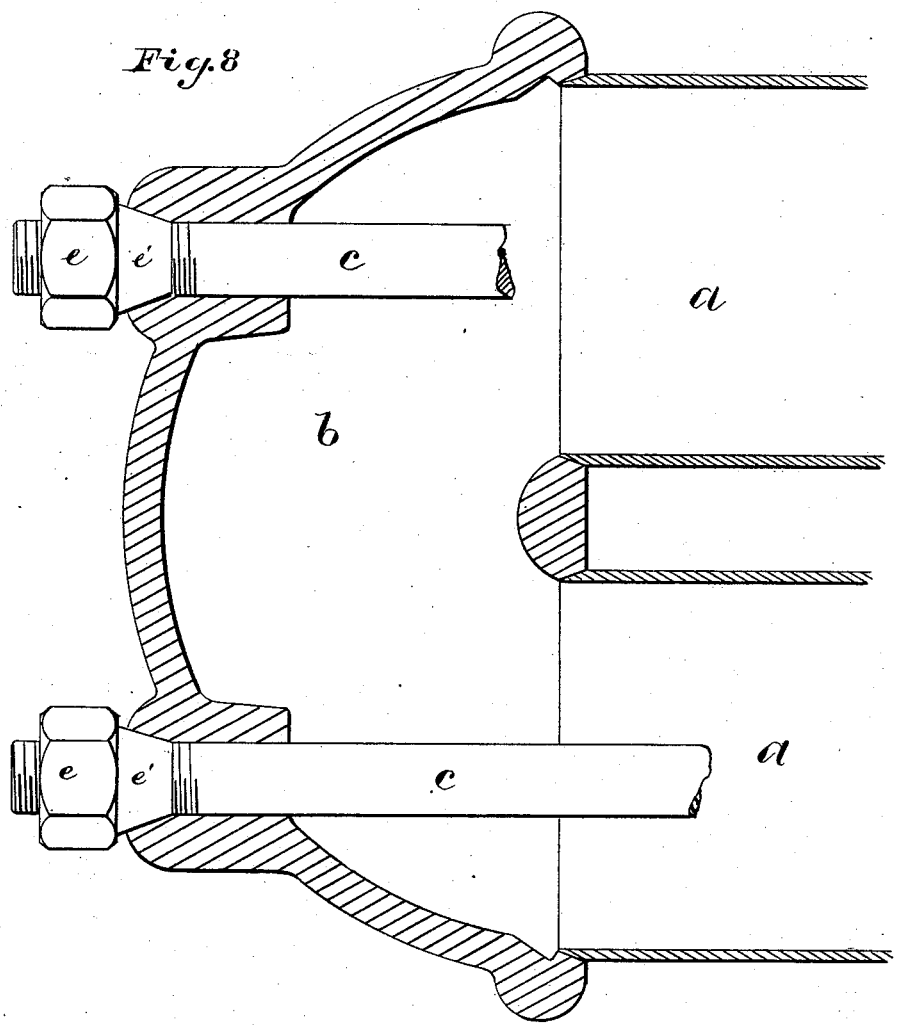

(No Model.) 5 Sheets—Sheet 5.
G. A. COLBY.
SECTIONAL STEAM BOILER.
No. 301,964. Patented July 15, 1884.
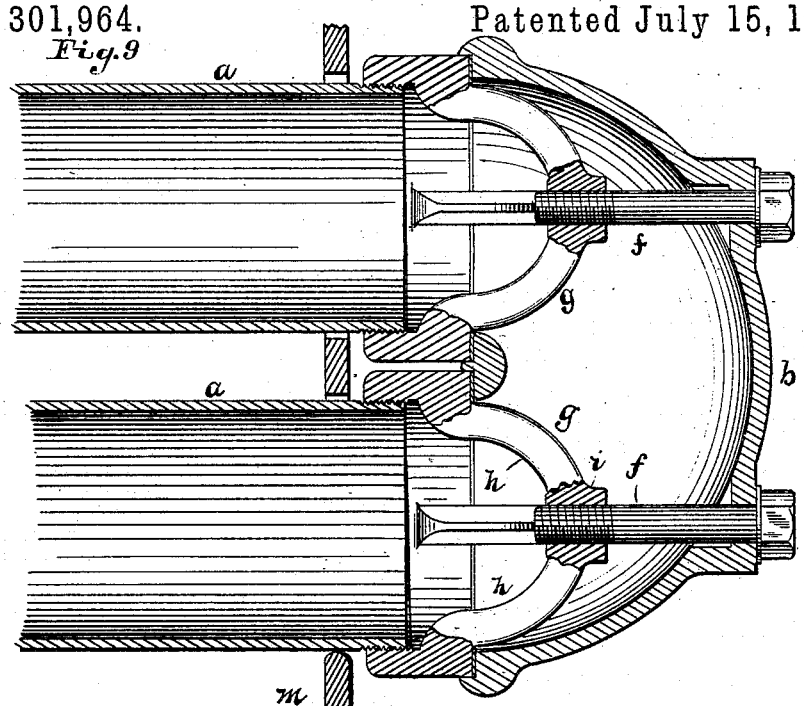
Fig. 9
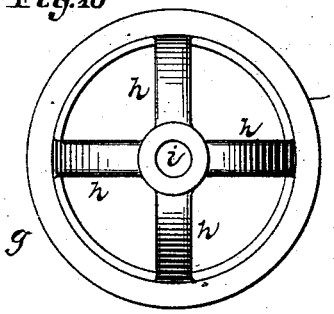
Fig. 10
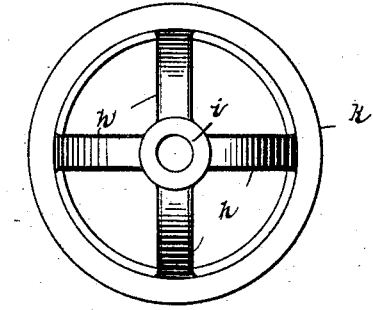
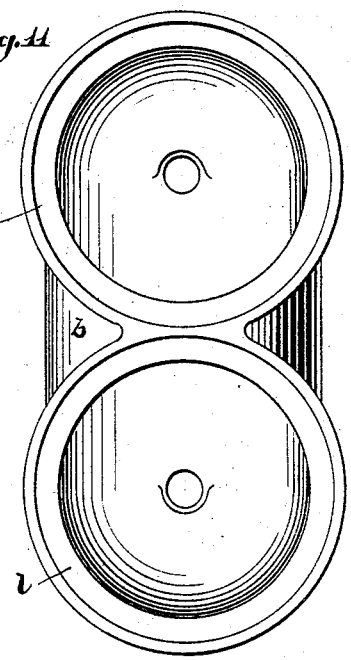
Fig. 11
Attest:
Paul A. Staley
C. C. Shepherd
Inventor
Gilbert A. Colby
By his Attorney
George P. Barton

UNITED STATES PATENT OFFICE.

GILBERT A. COLBY, OF AGUAS CALIENTES, MEXICO.

SECTIONAL STEAM-BOILER.

SPECIFICATION forming part of Letters Patent No. 301,964, dated July 15, 1884.

Application filed July 27, 1883. (No model.)

*To all whom it may concern:*

Be it known that I, GILBERT A. COLBY, a citizen of the United States, residing at Aguas Calientes, Mexico, have invented a certain new and useful Improvement in Sectional Steam-Boilers, of which the following is a full, clear, concise, and exact description, reference being had to the accompanying drawings, forming a part of this specification.

My invention relates to that class of sectional steam-boilers in which the heating-surface is composed of tubes or pipes through which the water circulates; and it consists in the series of independent circulating-pipes, a chamber connected therewith, a separation-chamber, the superheating-tubes, the mud-drum, divided into two compartments, to the upper compartment of which is connected a continuous circulating-pipe, the caps for the tubes, and the means for securing the said caps and tubes, as hereinafter described, and set forth in the combinations claimed.

Figure 1:
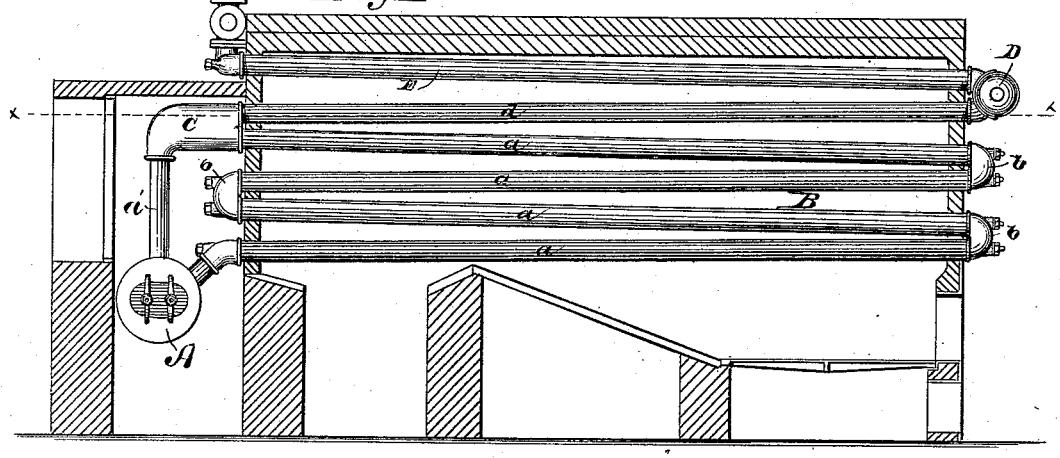
Figure 2:
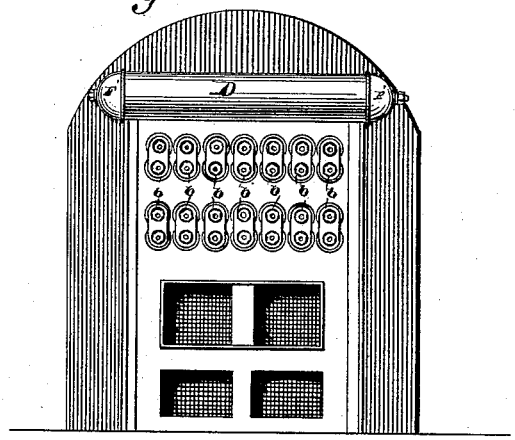

In the accompanying drawings, Figure 1 is a horizontal sectional elevation view of my improved boiler. Fig. 2 is a front elevation of the same. Fig. 3 is a sectional view showing the manner of connecting up the tubes. Fig. 4 is a partial sectional view of the separation-chamber. Figs. 5, 6, 7, 8, 9, 10, and 11 are details and modifications of some of the various parts referred to hereinafter.

The principal part of the heating-surface of my improved boiler is composed of a series of endless pipes, which lead from a mud-drum located at the rear of the furnace, and which pass longitudinally back and forth over the fire-box or furnace in vertical coils, returning to the mud-drum near to the place from which they start. By the peculiar construction of these endless pipes the water to be vaporized is by the action of the fire kept constantly circulating through them, thus bringing all of the water over the hottest portions of the furnace. In each one of the endless pipes, at the upper rear corner, is located a chamber, from which a branch pipe leads off to a separation-chamber, placed, preferably, on the outside of the fire-box at the front. In this separation-chamber the steam is separated from the water, and is conveyed back through the upper part of the furnace in superheating-tubes to the exit-pipe, from whence it issues in a thoroughly-dry condition.

In the drawings, A represents the mud-drum, which is placed at the lower rear corner of the boiler; B, the endless circulating-pipes, which connect at each end with the mud-drum; C, the chamber in each of said pipes, from which leads the branch or intermediate pipe, $d$, to the separation-chamber D. E E are the superheating-tubes, which convey the steam from the separation-chamber D to the exit-pipe.

The circulating-pipes B are each composed of tubes $a$, connected at their ends by caps $b$ in such manner as to form a vertical coil extending longitudinally back and forth through the furnace, and terminating at the chamber, from whence the continuity is maintained to the mud-drum A by a short vertical pipe, $a'$. The caps $b$ are constructed so as to form a steam-tight joint with the tube when joined thereto. This may be done in several different ways. In Fig. 6 I have shown the caps provided with grooves adapted to receive the ends of the tubes, said tubes being preferably turned off so as to form a tight joint with said caps. In Fig. 8 the tubes are shown fitted to the caps with ground joints, the ends of the tubes being beveled, as shown, and ground to a seat in the caps. The caps $b$ are held in place by rods $c$, which pass longitudinally through the tubes. These rods are provided at the front with nuts, which screw up against the caps, thus providing means for tightening up the caps on the tubes. To prevent leakage around the bolts where they project through the caps, suitable packing-boxes, $c'$, may be provided, said packing-boxes being adapted, when the nuts are screwed down, to form a steam-tight joint about the rods. This may also be accomplished by providing the nuts $e$ with a tapered end, $e'$, ground to a seat in the cap $b$, as shown in Fig. 8.

Instead of the rods $c$ extending through the tubes, the caps $b$ are preferably secured in place on the ends of the tubes by means of short bolts $f$, which pass through the said caps and screw into crab-collars $g$, as shown in Fig. 10. These crab-collars are screwed on the ends of the respective tubes, and are provided with arms $h$, which curve upward and inward and meet in the center, $i$, thus forming a boss or hub into which the bolt $f$ is screwed. (See Fig. 10 for detail.) The caps $b$ rest against the faces $k$ of the crab-collars, respectively, said caps being constructed so as to form a seat, $l$, for the said crab-collars. (See Fig. 11.) A packing-ring of soft copper or other suitable material may be interposed between the caps and collars, and also under the heads of the bolts $f$, to secure a steam-tight joint. The tubes $a$ extend through the front wall of the furnace, so that the caps $b$ are on the outside. These tubes are preferably supported on vibrating bearings, as indicated at $m$, Fig. 9, thus obviating any wear on the tubes which might be produced by a slight longitudinal movement of the tubes from expansion.

It will be seen that by the arrangement above described the interior of the tubes, or any of them, is readily accessible from the outside of the furnace by simply loosening the bolts which hold the caps in place. Any tube may thus be easily cleaned or removed for repairs without disturbing the other tubes.

The mud-drum A, I divide into two compartments by a curved partition, A'. This partition extends the entire length of the drum, and is so arranged that an opening, $o$, is left on each side between the edge of the partition and the wall of the mud-drum. This is for the purpose of collecting the sediment in the drum, as hereinafter described, from whence it may be blown out from time to time by the ordinary blow off valves provided for that purpose.

The separating-chamber D is composed of a cylindrical shell, F, provided at each end with a cap, F', which caps are held in position in a similar manner to the caps $b$ by a rod, $c$. (See Figs. 4 and 6.) On the outside of the shell F is secured a plate, P, provided with suitable openings to receive the ends of the branch pipes $d$ and the superheating-tubes E, which are screwed therein.

The water in the boiler stands up to the line $x$ $x$, and by the action of the heat on the front ends of the tubes $a$, which are directly over the fire, is caused to circulate through the circulating-pipes B in the direction indicated by the arrows. The water thus circulating enters the upper portion of the mud-drum, and, striking the curved partition A', is again directed toward the front, as indicated by the long arrow in Fig. 5. The sediment which is carried with the water will, however, not enter the pipes again, but will be washed along the surface of the partition and fall through the opening $o$ into the lower compartment of the drum, as indicated by the short arrows in Fig. 5. The steam from the circulating-pipes B rises into the separation-chamber through the pipes $d$. The wet steam here becomes separated from the water, and, passing through the superheating-pipes E E, becomes thoroughly dried before passing out at the exit-pipe.

It will be seen that a boiler constructed as above described has a very large heating-surface, and is very simple and compact. By the peculiar construction of the circulating-pipes the tubes need not stand at a greater angle than about three-eighths of an inch to the foot. I am thus enabled to use much longer tubes than heretofore.

The separation-chamber and the caps on the front end of the tubes, all being on the outside of the fire-box in front, can easily be opened or removed for cleaning or repairs. All the parts may be taken apart for transportation, as the whole is so simple that any ordinary mechanic can put it together.

I am aware of the United States Patent No. 40,722, dated November 24, 1863, and the German Patent No. 6,216, of October 8, 1878, and therefore disclaim the construction shown in said patents.

Having thus described my invention, I claim as new and desire to secure by Letters Patent—

1. In a steam-boiler, a mud-drum divided by a curved plate supported free from the inner walls of said drum into two compartments, to the upper of which is connected both ends of a continuous circulating-pipe, and the lower compartment being adapted to receive the sediment from the water circulating in said pipe, in combination with a separation-chamber connected by a downwardly-inclined branch pipe to said circulating-pipe and an upwardly-inclined superheating-tube leading from said separation-chamber, substantially as specified.

2. The combination, with circulating-pipes B, of a mud-drum, A, said mud-drum being divided into two compartments by a curved plate supported with its longitudinal edges free from the inner walls of the drum, substantially as and for the purpose set forth.

3. The combination, with a mud-drum, A, divided into two compartments, of a series of continuous circulating-pipes, B, said pipes being composed of tubes $a$, caps $b$, and bolts $f$, for holding said caps upon and against crab-collars, a branching chamber, C, and vertical pipes $a'$, said circulating-pipes being connected at each end to the upper compartment of said mud-drum, substantially as and for the purpose set forth.

4. The combination, with the continuous circulating-pipes B, arranged in vertical coils over the fire-box, said pipes being each composed of tubes $a$, caps $b$, said caps being held in place by bolts $f$, and bearing upon and against crab-collars $g$, branching chamber C, and vertical pipes $a'$, of a separation-chamber, D, connected by intermediate pipes to said circulating-pipes and superheating-tubes leading from said separation-chamber, substantially as set forth.

5. The combination, with tubes $a$, of crab-collars $g$ and caps $b$, bearing on said crab-collars, and provided with bearings for the heads of bolts $f$, passing through said caps and into the threaded crab-collars, substantially as specified.

6. In a steam-boiler, the combination, with the tubes $a$, of the vibrating bearing $m$, substantially as shown and described.

7. The combination of the cap $b$, having bolt-bearings and concentric crab-collar bearings, with crab-collars $g$, having threaded hub $i$, arches $h$, and squarely-finished rims adjacent to said arches, and screw-threads with said rims below said arches, substantially as shown and described.

In witness whereof I hereunto subscribe my name this 25th day of May, A. D. 1883.

GILBERT A. COLBY.

Witnesses:
 JOHN S. MORTON,
 ENRIQUE AUBERT.